(12) United States Patent
Childers et al.

(10) Patent No.: US 6,416,236 B1
(45) Date of Patent: Jul. 9, 2002

(54) FERRULE FOR FACILITATING FIBER-TO-FIBER CONTACT AND ASSOCIATED FABRICATION METHOD

(75) Inventors: Darrell R. Childers; James P. Luther; Dennis M. Knecht; Thomas Theuerkorn, all of Hickory, NC (US)

(73) Assignee: Siecor Operations, LLC, Hickory, NC (US)

( * ) Notice: Subject to any disclaimer, the term of this patent is extended or adjusted under 35 U.S.C. 154(b) by 0 days.

(21) Appl. No.: 09/390,482

(22) Filed: Sep. 7, 1999

(51) Int. Cl.$^7$ ................................................. G02B 6/36
(52) U.S. Cl. ........................................................ 385/84
(58) Field of Search ............................... 385/60, 70, 62, 385/71, 78, 80–84, 88–90, 56, 64

(56) References Cited

U.S. PATENT DOCUMENTS

| | | | |
|---|---|---|---|
| 4,192,575 A | * 3/1980 | Hodge | 385/70 |
| 5,214,730 A | 5/1993 | Nagasawa et al. | 385/59 |
| 5,867,621 A | 2/1999 | Luther et al. | 385/59 |
| 5,923,804 A | * 7/1999 | Rosson | 385/81 |
| 6,030,129 A | * 2/2000 | Rosson | 385/81 |
| 6,035,084 A | * 3/2000 | Haake et al. | 385/49 |
| 6,149,315 A | * 11/2000 | Stephenson | 385/60 |

* cited by examiner

Primary Examiner—Akm E. Ullah

(57) ABSTRACT

A ferrule and an associated fabrication method are provided that facilitates fiber-to-fiber contact without requiring the end portions of the optical fibers to protrude beyond the front face of the ferrule. The ferrule includes a ferrule body having opposed front and rear faces and defining at least one optical fiber bore extending between the front and rear faces and adapted to receive an optical fiber. Advantageously, at least the medial portion of the front face through which the optical fiber bores open protrudes outwardly beyond at least some peripheral portions of the front face. By designing the front face such that the medial portion protrudes outwardly beyond peripheral portions of the front face, angular errors in the peripheral portions of the front face and dirt or other particles that accumulate on the peripheral portions of the front face will not prevent the medial portions of the front faces of a pair of ferrules from making contacting as the respective fiber optic connectors are mated. As such, the end portions of the optical fibers need not protrude much, if any, beyond the front face of the ferrule in order to establish fiber-to-fiber contact such that the ferrule can absorb at least some of the forces that would otherwise be imparted to the optical fibers.

21 Claims, 3 Drawing Sheets

FERRULE FOR FACILITATING FIBER-TO-FIBER CONTACT AND ASSOCIATED FABRICATION METHOD

FIELD OF THE INVENTION

The present invention relates generally to ferrules for fiber optic connectors and associated fabrication methods and, more particularly, to ferrules designed to facilitate fiber-to-fiber contact once a pair of fiber optic connectors have been mated, as well as associated fabrication methods.

BACKGROUND OF THE INVENTION

Optical fibers are being increasingly utilized for a variety of applications including data transmission and the like. In order to interconnect the optical fibers, the fiber optic connectors that are typically mounted upon the opposed end portions of the optical fibers are appropriately mated. While the optical connections established by the mating of a pair of fiber optic connectors is generally quite good, some modern applications are placing increased performance and reliability demands upon optical fiber networks. In this regard, the optical connections established by mating a pair of fiber optic connectors preferably have relatively low attenuation and a small return loss.

In order to decrease the attenuation and return loss introduced by a fiber optic connector, conventional fiber optic connectors are designed such that fiber-to-fiber contact is established between the optical fibers upon which the respective fiber optic connectors are mounted. For example, fiber-to-fiber contact is preferably established between each optical fiber of a first fiber optic cable upon which a first fiber optic connector is mounted and a respective optical fiber of a second fiber optic cable upon which a second fiber optic connector is mounted once the first and second fiber optic connectors have been mated.

Unfortunately, the front faces of the ferrules of most fiber optic connectors have angular errors and are therefore not completely perpendicular to the optical fiber axes of the end portions of the optical fibers upon which the ferrules are mounted. In addition, the front faces of the ferrules of most fiber optic connectors are not perfectly flat. As such, the end portions of the optical fibers that are flush with the front face of the ferrule of a conventional fiber optic connector may not establish fiber-to-fiber contact with the corresponding optical fibers of another fiber optic connector since some portions of the front face of the ferrules may actually protrude outwardly beyond the end portions of the optical fibers. By protruding outwardly beyond the end portions of the optical fibers, portions of the front faces of the ferrules may contact before the optical fibers make fiber-to-fiber contact, thereby effectively preventing fiber-to-fiber contact. Likewise, dirt or other particles that settle upon the front face of the ferrule may prevent fiber-to-fiber contact in instances in which the end portions of the optical fibers are flush with the front face.

In order to overcome these problems and to provide for fiber-to-fiber contact, notwithstanding angular errors and dirt accumulation, the end portions of the optical fibers upon which the ferrules are mounted generally protrude or extend slightly beyond the front face of the respective ferrule. In this regard, the end portions of the optical fibers generally protrude by between about 500 nanometers and about 1,000 nanometers beyond the front face of the respective ferrule. As such, fiber-to-fiber contact can be established even if the front face has angular errors or if dirt or other particles have accumulated upon the front face.

In order to mount a fiber optic connector such that the end portions of the optical fibers extend beyond the front face of the ferrule by a predetermined protrusion distance, the optical fibers are typically inserted through and epoxied or otherwise secured within the optical fiber bores defined by the ferrule such that the end portions of the optical fibers extend beyond the front face of the ferrule by more than the desired protrusion distance. The end portions of the optical fibers are then polished until the end portions of the optical fibers protrude beyond the front face of the ferrule by the desired protrusion distance. Upon mating a pair of fiber optic connectors, the end portions of the optical fibers that protrude beyond the front faces of the respective ferrules will generally make fiber-to-fiber contact.

Unfortunately, the fiber-to-fiber contact established by the mating of a pair of conventional fiber optic connectors having protruding optical fibers imparts forces to the optical fibers that may exceed the sheer stress of the epoxy that otherwise secures the optical fibers within the optical fiber bores of the ferrule in some circumstances. If the forces exerted upon an optical fiber exceed the sheer stress of the epoxy, the optical fiber will generally be pushed back into the ferrule such that the end portion of the optical fiber is flush with the front face of the ferrule or recessed within the respective optical fiber bore relative to the front face of the ferrule.

The likelihood that the epoxy bond will be broken typically increases as the temperature rises. In this regard, most ferrules are formed of a thermoset material that expands to a much greater degree than the optical fibers in response to heating. As such, the fit of the optical fibers within the respective optical fiber bores is loosened as temperatures increase such that the optical fibers are even more likely to be pushed back into the respective optical fiber bores defined by the ferrule.

In instances in which the optical fibers are pushed back into the respective optical fiber bores defined by the ferrules, intermateability problems may arise if the respective fiber optic connector is subsequently mated with another fiber optic connector. For example, a fiber optic connector in which the optical fibers have been pushed back into the respective optical fiber bores defined by the ferrule may fail to establish fiber-to-fiber contact in instances in which the fiber optic connector is decoupled and then mated with another fiber optic connector. As such, the attenuation and return loss of the resulting optical connection would be greatly increased relative to optical connections having fiber-to-fiber contact.

SUMMARY OF THE INVENTION

A ferrule is therefore provided that facilitates fiber-to-fiber contact without requiring the end portions of the optical fibers to protrude beyond the front face of the ferrule. Accordingly, the ferrule reduces the forces that are placed upon the optical fibers and prevents the optical fibers from being pushed back into the respective optical fiber bores defined by the ferrule. As such, the ferrule of the present invention serves to maintain fiber-to-fiber contact even in instances in which the fiber optic connector is decoupled from an original fiber optic connector and remated with another fiber optic connector. By maintaining fiber-to-fiber contact, the ferrule of the present invention also serves to maintain the attenuation and return loss of the resulting optical connection at a relatively low level, as desired in many applications.

The ferrule of the present invention includes a ferrule body having opposed front and rear faces. The ferrule body also defines at least one optical fiber bore extending between the front and rear faces and adapted to receive an optical fiber. In addition, each optical fiber bore opens through a medial portion of the front face of the ferrule body. Advantageously, the medial portion of the front face through which the optical fiber bores open protrudes outwardly beyond at least some peripheral portions of the front face. Although the medial portion can protrude outwardly beyond at least some peripheral portions of the front face by different amounts, the medial portion of one advantageous embodiment protrudes outwardly by about 1–5 millimeters relative to at least some peripheral portions of the front face.

Since only the medial portion of the front face of the ferrule, and not the entire front face, will make contact as a pair of fiber optic connectors are mated, fiber-to-fiber contact can be established between the optical fibers even if the optical fibers are positioned such that end portions of the optical fibers are flush with, slightly protruding beyond or even slightly recessed relative to the front face of the ferrule. In this regard, any angular errors in the peripheral portions of the front face or any dust or other particles that accumulate on the peripheral portions of the front face will not interfere with the fiber-to-fiber contact since the peripheral portions of the front faces of the ferrules are recessed and never come into contact. Since the end portions of the optical fibers can be disposed flush with the front face of the ferrule, the ferrule body can serve to at least partially support the forces that would otherwise be imposed upon the optical fibers, thereby reducing the load placed upon the epoxy that bonds the optical fibers within the respective optical fiber bores.

In one embodiment, the front face defines a smoothly curved surface in which the medial portion of the front face protrudes outwardly beyond peripheral portions of the front face. As such, the optical fiber bores defined by the ferrule body of this embodiment open through the apex of the curved surface defined by the front face of the ferrule body. In addition to extending lengthwise between opposed front and rear faces, the ferrule body also extends laterally between opposed first and second sides. In this embodiment in which the front face defines a smoothly curved surface, the front face has a uniform size and shape at all points between the first and second sides when taken in cross-section in a lengthwise extending plane that is disposed parallel to the first and second sides. While the front face of the ferrule of this embodiment is uniformly sized and shaped, the smoothly curved front surface can take on various configurations. Typically, however, the smoothly curved front surface defines a circular arc and, in one embodiment, defines an interior angle of no more than 180° and has a radius of 5 millimeters.

In another embodiment, the medial portion of the front face through which each optical fiber bore opens is a planar surface that protrudes outwardly beyond peripheral portions of the front face. Although the medial portion is a planar surface, the peripheral portions of the front face of the ferrule of this embodiment are curved surfaces that taper rearwardly from the planar medial portion of the front face. While the planar medial portion can have various shapes and sizes, the planar medial portion of the front face of the ferrule of one advantageous embodiment is elliptical in shape and is oriented such that the major axis of the elliptical medial portion extends through each optical fiber bore.

In addition to the opposed front and fear faces, the ferrule has opposed first and second minor sides and opposed first and second major sides. Typically, the first and second minor sides are the opposed first and second lateral sides, while the first and second major sides are the opposed top and bottom sides of the ferrule body. In the embodiment of the ferrule having a front face with a planar medial portion, the peripheral portions of the front face that extend rearwardly from the medial portion of the front face to the first and second major sides preferably define a different radius than the peripheral portions of the front face that extend rearwardly from the medial portion of the front face to the first and second minor sides. For example, the peripheral portions of the front face that extend from the medial portion of the front face to the first and second major sides generally define a smaller radius than the peripheral portions of the front face that extend from the medial portion of the front face to the first and second minor sides. In one advantageous embodiment, for example, the peripheral portions of the front face that extend from the medial portion of the front face to the first and second major sides define a radius of 5 millimeters, while the peripheral portions of the front face that extend from the medial portion of the front face to the first and second minor sides define a radius of 15 millimeters.

According to one aspect of the present invention, a method is also provided for fabricating a multifiber ferrule having a planar medial portion. In this regard, a ferrule body is formed that has opposed front and rear faces and that defines a plurality of optical fiber bores extending therebetween and opening through a medial portion of the front face. The ferrule body that is formed also has opposed first and second minor sides and opposed first and second major sides. Once the ferrule body has been formed, the front face of the ferrule body is polished to form a curved surface. In particular, the peripheral portions of the front face proximate the first and second major sides are polished so as to have a different radius than the peripheral portions of the front face proximate the first and second minor sides. Preferably, the front face of the ferrule body is polished to form the curved surface by disposing polishing medial on a rubber pad and thereafter bringing the front face of the ferrule body into contact with the polishing media backed by the rubber pad. As such, the peripheral portions of the front face proximate the first and second major sides to define a smaller radius than the peripheral portions of the front face proximate to the first and second minor sides. Once the curved surface has been formed, the medial portion of the front face of the ferrule body is again polished to form a planar region, typically having an elliptical shape, through which the plurality of optical fiber bores open.

According to one embodiment in which the ferrule is a multifiber ferrule, the portion of the front face of the ferrule body through which each optical fiber bore opens defines a ring surrounding the respective optical fiber bore. According to this embodiment, each ring protrudes outwardly, such as by at least 1 millimeter, beyond other portions of the front face of the ferrule body. By protruding somewhat beyond other portions of the front face of the ferrule body, the rings also serve to prevent angular errors in the front face and dirt accumulation on the front face from interfering with the desired fiber-to-fiber contact. As such, the end portions of the optical fibers can be positioned flush with the rings while still permitting fiber-to-fiber contact. The rings can therefore support the forces otherwise imparted upon the optical fibers in order to reduce the load placed upon the epoxy bonding the optical fibers within the optical fiber bores.

In one embodiment, at least some of the rings intersect to form a series of interconnected rings that protrude outwardly beyond other portions of the front face of the ferrule body. In addition, the ferrule body of this embodiment generally defines a plurality of linearly aligned optical fiber bores including a pair of outermost optical fiber bores and at least one inner optical fiber bore. In order to provide additional support for the outermost optical fibers that typically make the initial fiber-to-fiber contact and, as a result, are generally subjected to greater forces than the remainder of the optical fibers, the rings that surround the outermost optical fiber bores can be larger in diameter than the rings that surround the respective inner optical fiber bores. For example, the rings that surround each optical fiber bore generally can have an inner diameter of 125 microns, with the rings that surround the inner optical fiber bores typically having an outer diameter of 250 microns and the rings that surround the outermost optical fiber bores having an even larger outer diameter.

By supporting the optical fibers and reducing the load on the epoxy bond between the optical fibers and the ferrule body, the ferrule of the present invention reduces the instances in which the optical fibers are pushed into the respective optical fiber bores. As a result, fiber optic connectors that include the ferrules of the present invention can be repeatedly remated in a manner that establishes fiber-to-fiber contact. Thus, fiber optic connectors incorporating the ferrule of the present invention continue to provide high quality optical connections with a relatively low level of attenuation and return loss even in instances in which the fiber optic connectors are decoupled and subsequently remated to other fiber optic connectors.

DETAILED DESCRIPTION OF THE INVENTION

Figure 1:
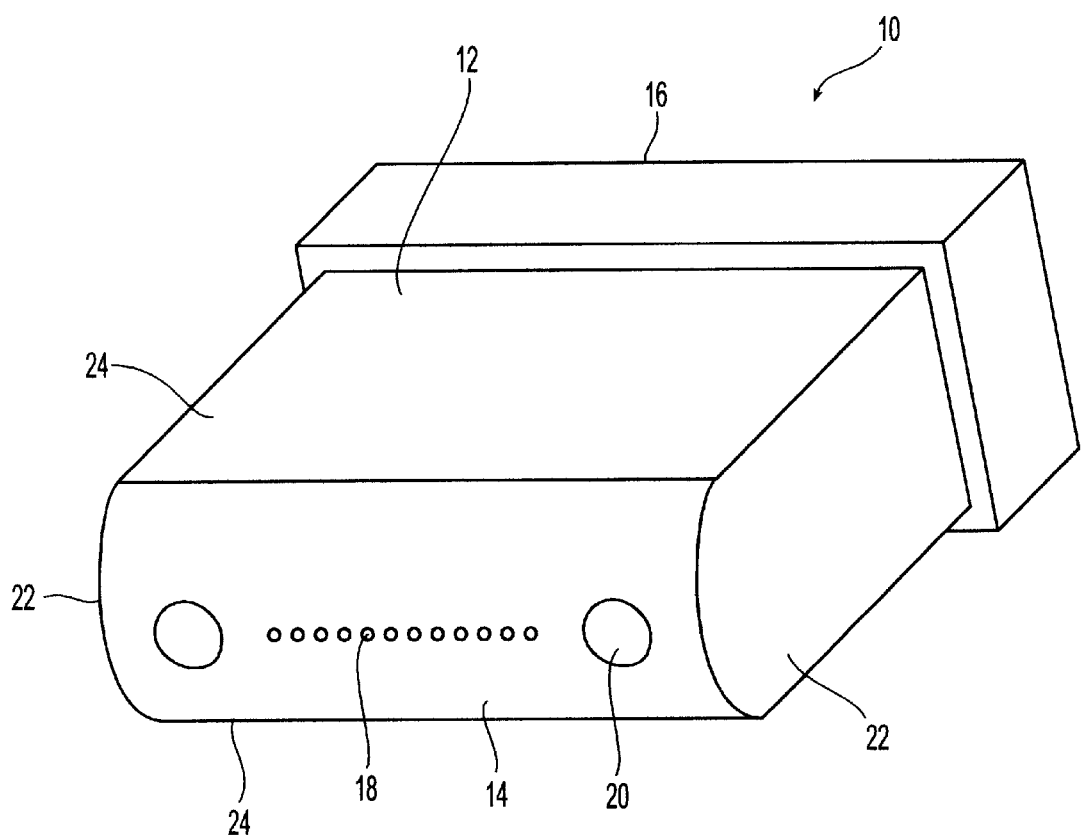
FIG. 1 is a perspective view of a ferrule according to one embodiment of the present invention that includes a curved front face.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As known to those skilled in the art, a fiber optic connector, albeit either a single fiber connector or a multifiber connector, includes a plurality of components that are assembled and mounted upon the end portions of one or more optical fibers. Of these components, each fiber optic connector generally includes a ferrule 10 that is mounted upon and bonded to end portions of the optical fibers. In general terms, a ferrule includes a ferrule body 12 having opposed front and rear faces 14, 16. While the front face of the ferrule of the present invention has a unique shape as described hereinafter, the remainder of the ferrule can have any desired shape and, as such, can have the shape of any conventional ferrule, including a multifiber ferrule, such as an MTP ferrule or an SC/DC ferrule, or a single fiber ferrule, such as an SC, ST, or FC ferrule.

The ferrule body 12 defines at least one optical fiber bore 18 extending between the front and rear faces 14, 16 and adapted to receive an optical fiber. While the ferrule 10 of the present invention can be a single fiber ferrule that defines only a single optical fiber bore, the ferrule of the present invention will be hereinafter described in conjunction with embodiments in which the ferrule is a multifiber ferrule that defines a plurality of optical fiber bores adapted to receive optical fibers. Typically, multifiber ferrules also define at least one and, more commonly, a pair of guide pin openings 20. The guide pin openings also extend between the front and rear faces and are adapted to receive respective guide pins in order to align a pair of ferrules and, in turn, the optical fibers upon which the ferrules are mounted as the respective fiber optic connectors are mated.

As shown in FIG. 1, a plurality of optical fiber bores 18 generally open through a medial portion of the front face 14 of the ferrule body 12, while the guide pin openings 20 open through a lateral portion of the front face of the ferrule body. In order to permit fiber-to-fiber contact to be established even in instances in which the end portions of the optical fibers are flush with the front face, the medial portion of the front face of the ferrule preferably protrudes outwardly in a forward direction relative to peripheral portions of the front face. Although the medial portion of the front face of the ferrule can protrude outwardly in a forward direction by different amounts relative to peripheral portions of the front face, the medial portion of the front face of a ferrule of the present invention preferably protrudes outwardly by a distance d of at least 1–5 millimeters relative to peripheral portions of the front face as graphically indicated in FIG. 5.

The ferrule body 12 has opposed first and second lateral or minor sides 22 and opposed first and second major sides 24. As shown, the peripheral portions of the front face 14 proximate the first and second major sides are recessed relative to medial portions of the front face. In the embodiment of the ferrule 10 depicted in FIG. 1, the front face has a uniform shape from the first lateral side to the second lateral side. By way of example, the profile or shape of the front face of the ferrule of the embodiment of FIG. 1 will be uniform when taken in cross-section in a lengthwise extending plane that is perpendicular to the opposed first and second major sides and parallel to the first and second lateral sides. Thus, the profile or shape of the front face of the ferrule of this embodiment is the same at the first lateral side, at the second lateral side and at all points between the first and second lateral sides.

As shown in FIG. 1, the front face 14 of the ferrule 10 of one advantageous embodiment defines a smoothly curved surface. Preferably, the smoothly curved front face defines a circular arc. For example, the circular front surface of one preferred embodiment defines an interior angle of no more than 180° and has a radius of 1.2 millimeters to 5 millimeters or more. In addition, the ferrule body 12 is preferably designed such that the optical fiber bores 18 open through the apex or the forwardmost portion of the curved surface of the front face which generally protrudes beyond peripheral portions of the front face by 3–5 millimeters. As such, upon mating a pair of fiber optic connectors that each include the ferrule of FIG. 1, the ferrules will only make contact along the line that extends through the centers of the optical fiber bores, thereby preventing any angular errors in the other portions of the front face and any dirt or other particles that accumulate upon other portions of the front face from interfering with the fiber-to-fiber contact. See FIG. 5. In contrast to the circular arc extending between the first and second major sides 24, the long axis extending through the optical fiber bores and the first and second minor sides 22 is preferably linear according to this embodiment of the present invention. In any event, the ferrule is preferably formed such that the long axis is not intentionally curved, even though the long axis may have a slight curve, i.e., a curve having a large radius, as a result of limitations in the fabrication process. In instances in which the long axis is inadvertently curved, the curved axis defines a radius that is greater than 30 millimeters, and ideally, is infinite.

Figure 2:
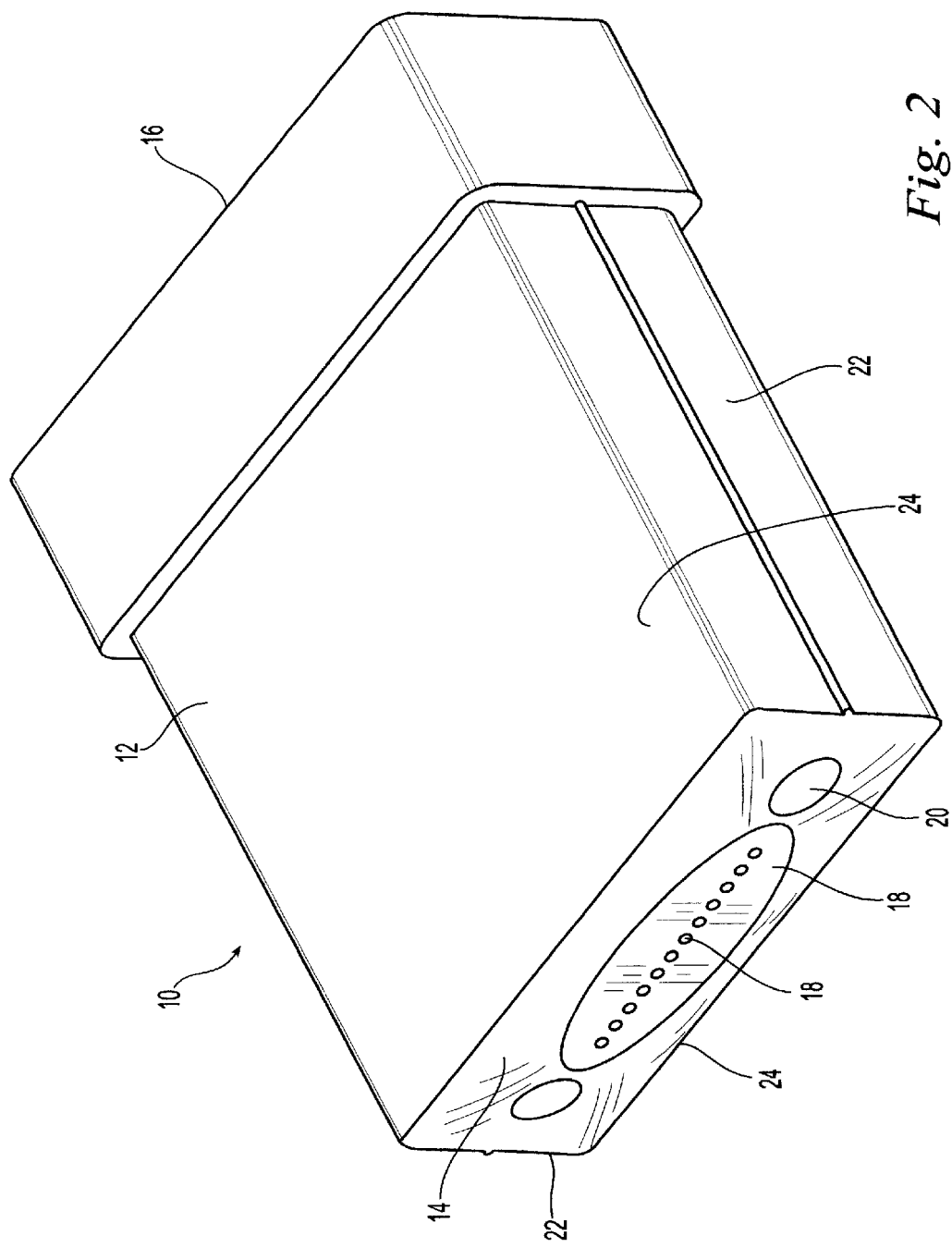
FIG. 2 is a ferrule according to another embodiment of the present invention that includes a planar medial portion and rearwardly tapering peripheral portions.

However, the front face 14 of the ferrule 10 need not be smoothly curved. For example, the medial portion 19 of the front face can be a planar surface through which the optical fiber bores 18 open. As shown in FIG. 2, the planar medial portion of the front face may be elliptical in shape, thereby forming an ellipsoid. In this regard, the elliptically shaped medial portion preferably defines a major axis that extends through each optical fiber bore. As also shown in FIG. 2, the planar medial portion of the front face still protrudes outwardly beyond the rearwardly tapering peripheral portions. In this regard, the peripheral portions are curved surfaces that taper rearwardly from the planar medial portion. However, the curved surfaces that form the peripheral portions of the front face of this embodiment are not necessarily curved in the same fashion and do not need to define the same radius. For example, the peripheral portions of the front face that extend from the medial portion of the front face to the first and second major sides 24 generally define a different and, more specifically, a smaller radius than the peripheral portions of the front face that extend from the medial portion of the front face to the first and second minor sides 22. In one advantageous embodiment, for example, the peripheral portions of the front face that extend from the medial portion of the front face to the first and second major sides define a radius of 5 millimeters, while the peripheral portions of that front face that extend from the medial portion of the front face to the first and second minor sides define a radius of 15 millimeters. In any event, the medial portion of the front face of the ferrule through which the optical fiber bores open protrudes outwardly or forwardly by the greatest amount relative to peripheral portions of the front face of the ferrule. For example, the medial portion of the front face typically protrudes by between 1 and 2 millimeters beyond peripheral portions of the front face.

According to one aspect of the present invention, a method is also provided for fabricating a multifiber ferrule 10 having a planar medial portion 19. In this regard, a ferrule body is formed that has opposed front and rear faces 14, 16 and that defines a plurality of optical fiber bores 18 extending therebetween and opening through a medial portion of the front face. The ferrule body that is formed also has opposed first and second minor sides 22 and opposed first and second major sides 24. Once the ferrule body has been formed, the front face of the ferrule body is polished to form a curved surface. According to this aspect of the present invention, the peripheral portions of the front face proximate the first and second major sides are polished so as to have a different radius than the peripheral portions of the front face proximate the first and second minor sides. Preferably, the front face of the ferrule body is polished to form the curved surface by disposing polishing media upon a rubber pad and thereafter bringing the front face of the ferrule body into contact with the polishing media backed by the rubber pad. As a result of the manner in which rubber pad compresses, the peripheral portions of the front face proximate the first and second major sides are defined to have a smaller radius than the peripheral portions of the front face proximate to the first and second minor sides. However, other methods can be used to polish the front face to achieve the same surface. Thereafter, the medial portion 19 of the front face of the ferrule body is polished to form a planar region, typically having an elliptical shape, through which the plurality of optical fiber bores open. Although the medial portion of the front face can be polished in different manners, the medial portion of the front face is typically polished by disposing polishing media upon a glass plate and thereafter bringing the medial portion of the front face into contact with the polishing media.

While the entire front face 14 of the ferrule 10 can be specially shaped as shown in conjunction with the embodiments of FIGS. 1 and 2, the front face of the ferrule can be configured such that only those portions surrounding the optical fiber bores 18 protrude outwardly beyond the remainder of the front face. For example, the ferrule of FIG. 3 has a front face that defines a number of outwardly extending rings 26 surrounding respective optical fiber bores. As shown, each ring protrudes outwardly beyond other portions of the front face of the ferrule body. In the embodiment to FIG. 3, for example, all portions of the front face other than the rings surrounding the respective optical fiber bores are planar. However, those portions of the front face of the ferrule body 12 other than the rings that surround the optical fiber bores can define a sloping or tapered surface that would typically taper rearwardly from the rings to peripheral portions of the front face in much the same manner as described above in conjunction with other embodiments of the ferrule of the present invention.

Figure 3:
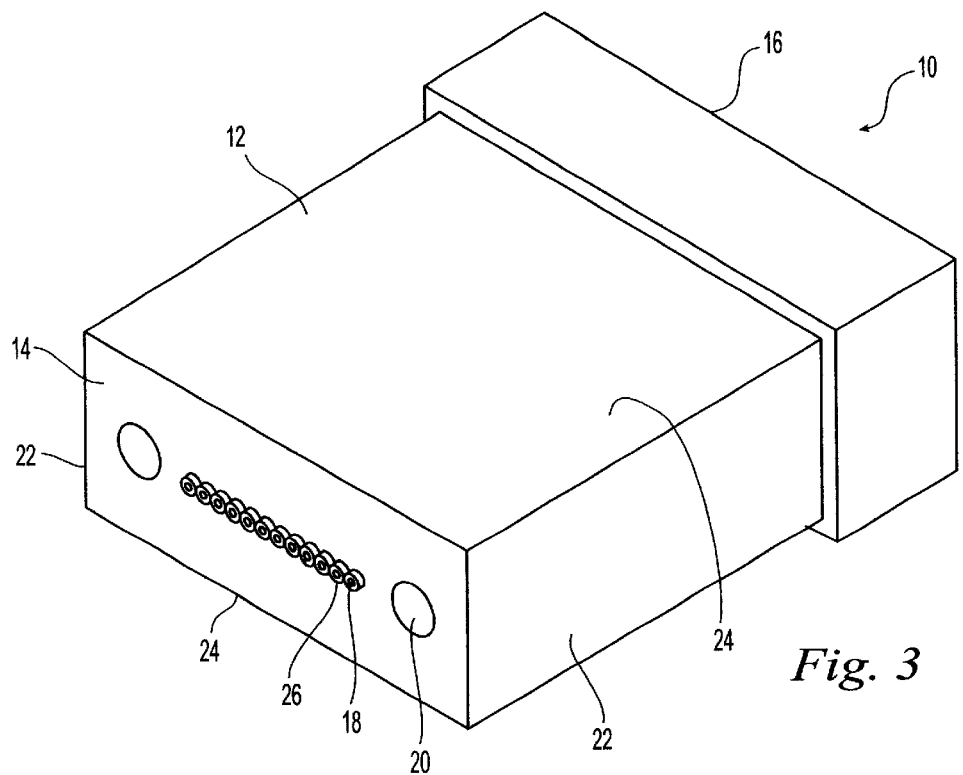
FIG. 3 is a ferrule according to another embodiment of the present invention that includes a plurality of rings surrounding the respective optical fiber bores.

As shown in FIG. 3, each of the rings 26 may be of an equal size. While the rings may be sized differently depending upon the application, the rings of one embodiment protrude outwardly by at least 1 millimeter relative to other portions of the front face 14 of the ferrule body 12 in order to form pedestal-like structures. In addition, while the diameter of the rings can vary depending upon the application, the rings of one advantageous embodiment have an inner diameter of 125 microns and an outer diameter of 250 microns.

Figure 4:
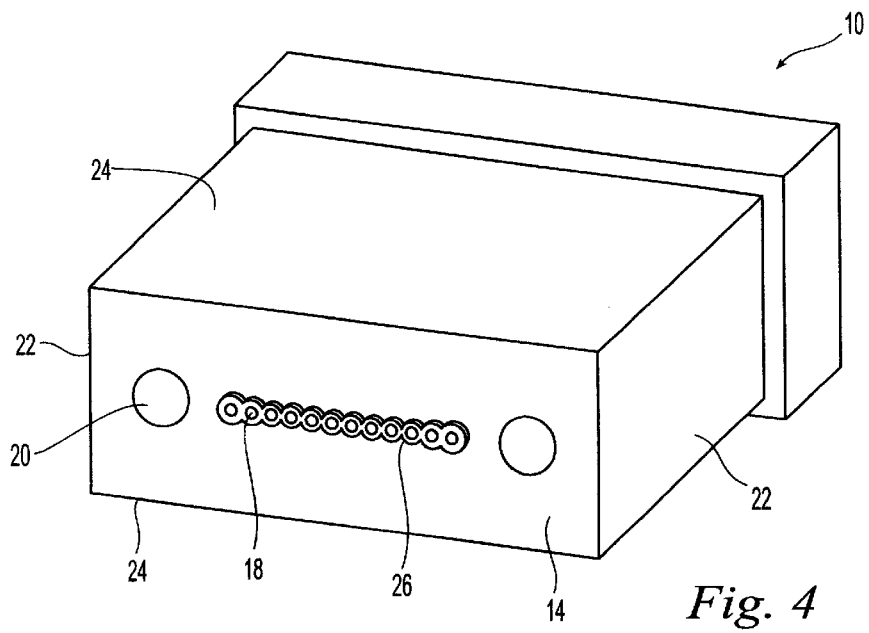
FIG. 4 is a ferrule according to another embodiment of the present invention that also includes a plurality of rings surrounding the respective optical fiber bores in which the outermost rings are larger than the inner rings in order to further support the outermost optical fibers.

The optical fiber bores 18 are generally laterally spaced from one another and the rings 26 that surround the optical fiber bores can therefore be sized such that each ring is separate and does not contact the adjacent rings. However, the optical fiber bores can be laterally spaced and/or the rings can be sized such that adjacent rings intersect as shown in the ferrule of FIG. 4. In this instance, the rings can form a series of interconnected rings, all of which protrude outwardly beyond other portions of the front face 14 of the ferrule body 12.

Since the medial portion of the front face 14 of the ferrule body 12 protrudes outwardly beyond other portions of the front face, the ferrule 10 of each of the embodiments of the present invention prevents angular errors in the peripheral portions of the front face 14 and dirt or other particles that accumulate on the peripheral portions of the front face from obstructing the fiber-to-fiber contact that is desirably established as a pair of fiber optic connectors are mated. Thus, the end portions of the optical fibers need not protrude nearly as far, if at all, beyond the front face as is required by conventional ferrules in order to insure that fiber-to-fiber contact is established. For example, the ferrule of the present invention is typically mounted upon the end portions of optical fibers such that the end portions of the optical fibers are no more than 50 nanometers beyond adjacent portions of the front face and, in some embodiments as shown FIG. 5, flush with adjacent portions of the front face or even recessed up to 50 nanometers relative to adjacent portions of the front face.

Figure 5:
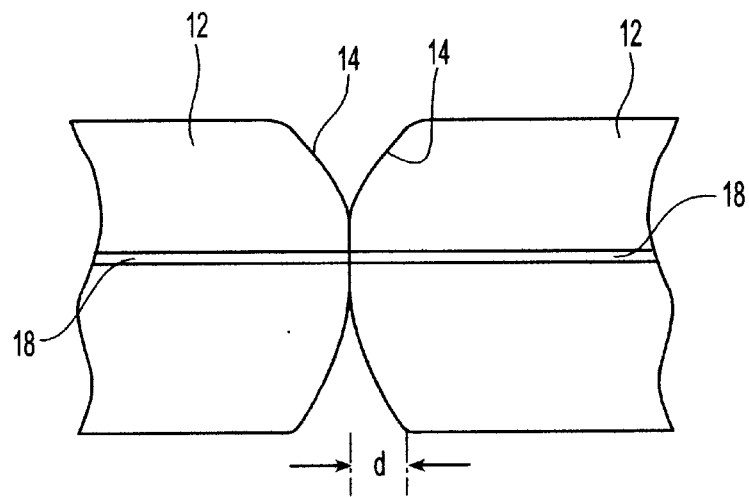
FIG. 5 is a fragmentary cross-sectional view of a pair of ferrules that are mated such that fiber-to-fiber contact is established between the optical fibers upon which the respective ferrules are mounted.

In the embodiment in which the end portions of the optical fibers are flush with or slightly recessed relative to adjacent portions of the front face 14, the ferrule 10 of the present invention also serves to protect the optical fibers from the forces to which the optical fibers are otherwise subjected or fiber-to-fiber contact is established. As shown in FIG. 5, for example, upon establishing fiber-to-fiber contact between a pair of optical fibers that are mounted flush with the front face of the ferrule, the medial portions of the ferrules that define the optical fiber bores 18 also make contact. As such, the forces that would otherwise be imparted upon the fibers following fiber-to-fiber contact will now be supported in large part by the ferrule body 12. In this regard, a graphic illustration of the support provided by the ferrule body and the impact of the forces upon the front face of the ferrule body is shown by the flattening of the otherwise curved medial portion of the front face of the ferrule of FIG. 5. By supporting the forces that would otherwise be placed upon the optical fibers, the ferrule of the present invention generally prevents the forces from exceeding the sheer strength of the epoxy holding the optical fibers within the respective optical fiber bores such that the optical fibers are not pushed back into the optical fiber bores.

As described above in conjunction with the embodiment of a ferrule 10 having a curved front face 14, the rings 26 of the ferrules of FIGS. 3 and 4 serve to absorb at least some of the forces that would otherwise be imparted to the optical fibers upon making fiber-to-fiber contact. In at least some instances in which the ferrule body 12 defines a plurality of linearly aligned optical fiber bores 18 including a pair of outermost optical fiber bores and at least one inner optical fiber bore, it has been observed that the outermost optical fibers are subjected to greater forces than the inner optical fibers. The outermost optical fibers are generally subjected to greater forces since the ferrules are not generally perfectly aligned as the respective fiber optic connectors are mated, such that the outermost optical fibers typically make fiber-to-fiber contact prior to the remainder of the optical fibers. As such, the rings that surround the outermost optical fiber bores can be larger in diameter than the rings that surround the respective inner optical fiber bores. While the outer diameter of the rings that surround the outermost fiber bores can be greater than the outer diameter of the rings that surround the inner optical fiber bores by any amount, the rings that surround the outermost optical fiber bores of one embodiment generally have an outer diameter that is 150% to 200% of the outer diameter of the rings that surround the inner optical fiber bores. As such, the rings that surround the outermost optical fiber bores provide further support for the outermost optical fibers relative to the support provided by the rings that surround the inner optical fibers.

By supporting the optical fibers and reducing the load on the epoxy bond between the optical fibers and the ferrule body 12, the ferrule 10 of the present invention reduces the instances in which the optical fibers are pushed into the respective optical fiber bores 18. As a result, fiber optic connectors that include the ferrules of the present invention can be repeatedly remated in a manner that establishes fiber-to-fiber contact. Thus, fiber optic connectors incorporating the ferrule of the present invention continue to provide high quality optical connections with a relatively low level of attenuation and return loss even in instances in which the fiber optic connectors are decoupled and subsequently remated to other fiber optic connectors.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A ferrule comprising:
   a ferrule body extending lengthwise between opposed front and rear faces, said ferrule body defining at least one optical fiber bore also extending lengthwise between the front and rear faces and adapted to receive an optical fiber, wherein each optical fiber bore opens through a medial portion of the front face of said ferrule body,
   wherein the medial portion of the front face through which each optical fiber bore opens is a planar surface that protrudes outwardly beyond peripheral portions of the front face, and wherein the peripheral portions of the front face are curved surfaces that taper rearwardly from the planar medial portion of the front face.

2. The ferrule according to claim 1 wherein said ferrule body has opposed first and second minor sides and opposed first and second major sides, and wherein the peripheral portions of the front face that extend from the medial portion of the front face to the first and second major sides define a different radius than the peripheral portions of the front face that extend from the medial portion of the front face to the first and second minor sides.

3. The ferrule according to claim 2 wherein the peripheral portions of the front face that extend from the medial portion of the front face to the first and second major sides define a smaller radius than the peripheral portions of the front face that extend from the medial portion of the front face to the first and second minor sides.

4. The ferrule according to claim 3 wherein the peripheral portions of the front face that extend from the medial portion of the front face to the first and second major sides define a radius of 5 millimeters, and wherein the peripheral portions of the front face that extend from the medial portion of the front face to the first and second minor sides define a radius of 15 millimeters.

5. The ferrule according to claim 1 wherein the planar medial portion of the front face is elliptical in shape.

6. The ferrule according to claim 5 wherein the elliptically shaped medial portion of the front face defines a major axis that extends through each optical fiber bore.

7. The ferrule according to claim 1 wherein the medial portion protrudes outwardly by between 1 and 2 millimeters relative to at least some peripheral portions of the front face.

8. A ferrule comprising:
   a ferrule body extending lengthwise between opposed front and rear faces and laterally between opposed first and second sides, said ferrule body defining at least one optical fiber bore also extending lengthwise between the front and rear faces and adapted to receive an optical fiber, wherein the at least one optical fiber bore opens through a medial portion of the front face of said ferrule body, wherein the front face defines a smoothly curved front surface such that the medial portion of the front face protrudes outwardly beyond peripheral portions of the front face and each optical fiber bore opens through an apex of the curved front surface, and wherein the front face has a uniform size and shape at all points between the first and second sides when taken in cross-section in a lengthwise extending plane that is disposed parallel to the first and second sides.

9. The ferrule according to claim 8 wherein the medial portion protrudes outwardly by 5 millimeters relative to at least some peripheral portions of the front face.

10. The ferrule according to claim 8 wherein the smoothly curved front surface defines a circular arc.

11. The ferrule according to claim 10 wherein the circular front surface defines an interior angle of no more than 180°.

12. The ferrule according to claim 10 wherein the circular front surface defines a radius of 5 millimeters.

13. The multifiber ferrule comprising:
a ferrule body having opposed front and rear faces, said ferrule body defining a plurality of optical fiber bores extending between the front and rear faces and adapted to receive optical fibers,
wherein a portion of the front face of said ferrule body through which each optical fiber bore opens defines a ring surrounding the respective optical fiber bore, and wherein each ring protrudes outwardly beyond other portions of the front face of said ferrule body.

14. The multifiber ferrule according to claim 13 wherein at least some of the rings intersect to thereby form a series of interconnected rings that protrude outwardly beyond other portions of the front face of said ferrule body.

15. The multifiber ferrule according to claim 13 wherein said ferrule body defines a plurality of linearly aligned optical fiber bores including a pair of outermost optical fiber bores and at least one inner optical fiber bore, and wherein the rings that surround the outermost optical fiber bores have a larger outer diameter than the rings that surround the respective inner optical fiber bores.

16. The multifiber ferrule according to claim 13 wherein each ring protrudes outwardly by at least 1 millimeter relative to other portions of the front face of said ferrule body.

17. The multifiber ferrule according to claim 13 wherein each ring defines an inner diameter of 125 microns and an outer diameter of 250 microns.

18. A method of fabricating a multifiber ferrule comprising:
forming a ferrule body having opposed front and rear faces and defining a plurality of optical fiber bores extending therebetween and opening through a medial portion of the front face, the ferrule body having opposed front and second minor sides and opposed first and second major sides;
polishing the front face of the ferrule body to thereby form a curved surface, said polishing step comprising polishing peripheral portions of the front face proximate the first and second major sides to have a different radius than peripheral portions of the front face proximate the first and second minor sides; and
thereafter polishing the medial portion of the front face of the ferrule body to form a planar region through which the plurality of optical fiber bores open.

19. The method according to claim 18 wherein polishing the front face of the ferrule body to form a curved surface comprises polishing the peripheral portions of the front face proximate the first and second major sides to define a smaller radius than the peripheral portions of the front face proximate the first and second minor sides.

20. The method according to claim 19 wherein polishing the peripheral portions of the front face proximate the first and second major sides comprises polishing the peripheral portions of the front face that extend proximate the first and second major sides to define a radius of 5 millimeters, and wherein polishing the peripheral portions of the front face proximate the first and second minor sides comprises polishing the peripheral portions of the front face to define a radius of 15 millimeters.

21. The method according to claim 18 wherein polishing the medial portion of the front face of the ferrule body comprises forming an elliptically shaped planar medial portion.

* * * * *

UNITED STATES PATENT AND TRADEMARK OFFICE
CERTIFICATE OF CORRECTION

PATENT NO. : 6,416,236 B1
DATED : July 9, 2002
INVENTOR(S) : Darrell R. Childers et al.

It is certified that error appears in the above-identified patent and that said Letters Patent is hereby corrected as shown below:

<u>Title page,</u>
Item [73], Assignee: add -- Siecor Operations, LLC --, and add -- Corning Cable Systems LLC --

Signed and Sealed this

Twenty-eighth Day of January, 2003

JAMES E. ROGAN
*Director of the United States Patent and Trademark Office*